(12) United States Patent
Francis et al.

(10) Patent No.: US 9,004,822 B2
(45) Date of Patent: Apr. 14, 2015

(54) ROTARY CUTTING TOOL WITH EFFECTIVE CHIP EVACUATION

(71) Applicant: Kennametal Inc., Latrobe, PA (US)

(72) Inventors: Mark Alan Francis, Solon, OH (US); Michael David Saffels, Mogadore, OH (US)

(73) Assignee: Kennametal Inc., Latrobe, PA (US)

( * ) Notice: Subject to any disclaimer, the term of this patent is extended or adjusted under 35 U.S.C. 154(b) by 183 days.

(21) Appl. No.: 13/711,667

(22) Filed: Dec. 12, 2012

(65) Prior Publication Data

US 2014/0161543 A1    Jun. 12, 2014

(51) Int. Cl.
*B23C 5/00* (2006.01)
*B23C 5/16* (2006.01)
*B23C 5/06* (2006.01)
*B23C 5/28* (2006.01)

(52) U.S. Cl.
CPC .............. *B23C 5/165* (2013.01); *B23C 5/006* (2013.01); *B23C 5/06* (2013.01); *B23C 2230/04* (2013.01)

(58) Field of Classification Search
CPC ............... B23C 5/006; B23C 2222/28; B23C 2226/315; B23C 2250/04; B23C 2250/08
USPC .......................................... 407/33, 35, 66, 67
See application file for complete search history.

(56) References Cited

U.S. PATENT DOCUMENTS

| | | | | |
|---|---|---|---|---|
| 1,529,917 A | * | 3/1925 | Redinger | 407/49 |
| 2,230,662 A | * | 2/1941 | Whitman | 407/31 |
| 2,476,749 A | * | 7/1949 | Marsh | 407/60 |
| 2,600,280 A | * | 6/1952 | Staples | 408/156 |
| 2,680,283 A | * | 6/1954 | See et al. | 407/32 |
| 5,605,420 A | * | 2/1997 | Feldsine | 407/32 |
| 5,800,079 A | * | 9/1998 | Qvarth | 407/46 |
| 6,595,727 B2 | | 7/2003 | Arvidsson | |
| 2008/0279642 A1 | | 11/2008 | Stadtfeld et al. | |

FOREIGN PATENT DOCUMENTS

JP       02-185343       7/1990

* cited by examiner

*Primary Examiner* — Will Fridie, Jr.
(74) *Attorney, Agent, or Firm* — Larry R. Meenan

(57) ABSTRACT

A rotary cutting tool, such as a milling cutter (10) includes a central hub (12), a cutting rim (14) and a plurality of spokes (22) connecting the central hub (12) to the cutting rim (14). Each spoke (22) is separated by an opening (32) and polygonal in cross-sectional shape formed by two side walls (22*a*, 22*b*), two front walls (22*c*, 22*d*) and a rear wall (22*e*). One of the side walls (22*a*) of each spoke (22) is formed at a pitch angle (42) with respect to a central axis (11) of the cutting tool (10) that is sufficient to cause lift of chips through the opening (32), thereby providing effective chip evacuation during a material removal operation.

16 Claims, 5 Drawing Sheets

ROTARY CUTTING TOOL WITH EFFECTIVE CHIP EVACUATION

BACKGROUND OF THE INVENTION

The invention relates in general to a rotary cutting tool, and in particular to a milling cutter with a plurality of spokes having a pitch that causes a suction proximate the workpiece to effectively evacuate chips from the workpiece.

Rotary cutting tools, such a milling cutters and the like, are frequently subjected to situations where chip evacuation becomes increasingly important due to constricted or confined areas on the workpiece. Inadequate chip evacuation can cause a smeared finish on the workpiece, prematurely worn cutting edges on the cutting inserts, and packed chips.

SUMMARY OF THE INVENTION

The problem of inadequate chip evacuation is solved by a rotary cutting tool, such as a milling cutter and the like, with a plurality of spokes extending radially outward from a hub to a rim. One side wall of the spokes have a pitch angle that creates lift in an area proximate the workpiece during a metal cutting operation, thereby providing effective chip evacuation during the material removal operation.

In one aspect of the invention, a milling cutter for removing material from a workpiece comprises a body having a central hub and a cutting rim; and a plurality of spokes extending outward in a radial direction from the central hub to the cutting rim, each spoke separated by an opening, wherein chips produced during a material removal operation are lifted through the opening, thereby providing effective chip evacuation during the material removal operation.

In another aspect of the invention, a milling cutter for removing material from a workpiece comprises a body having a central hub and a cutting rim; and a plurality of spokes connecting the central hub to the cutting rim, each spoke separated by an opening and polygonal in cross-sectional shape formed by two side walls, two front walls and a rear wall, wherein one of the side walls of each spoke is formed at a pitch angle with respect to a central axis of the cutting tool that is sufficient to cause lift of chips through the opening, thereby providing effective chip evacuation during a material removal operation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
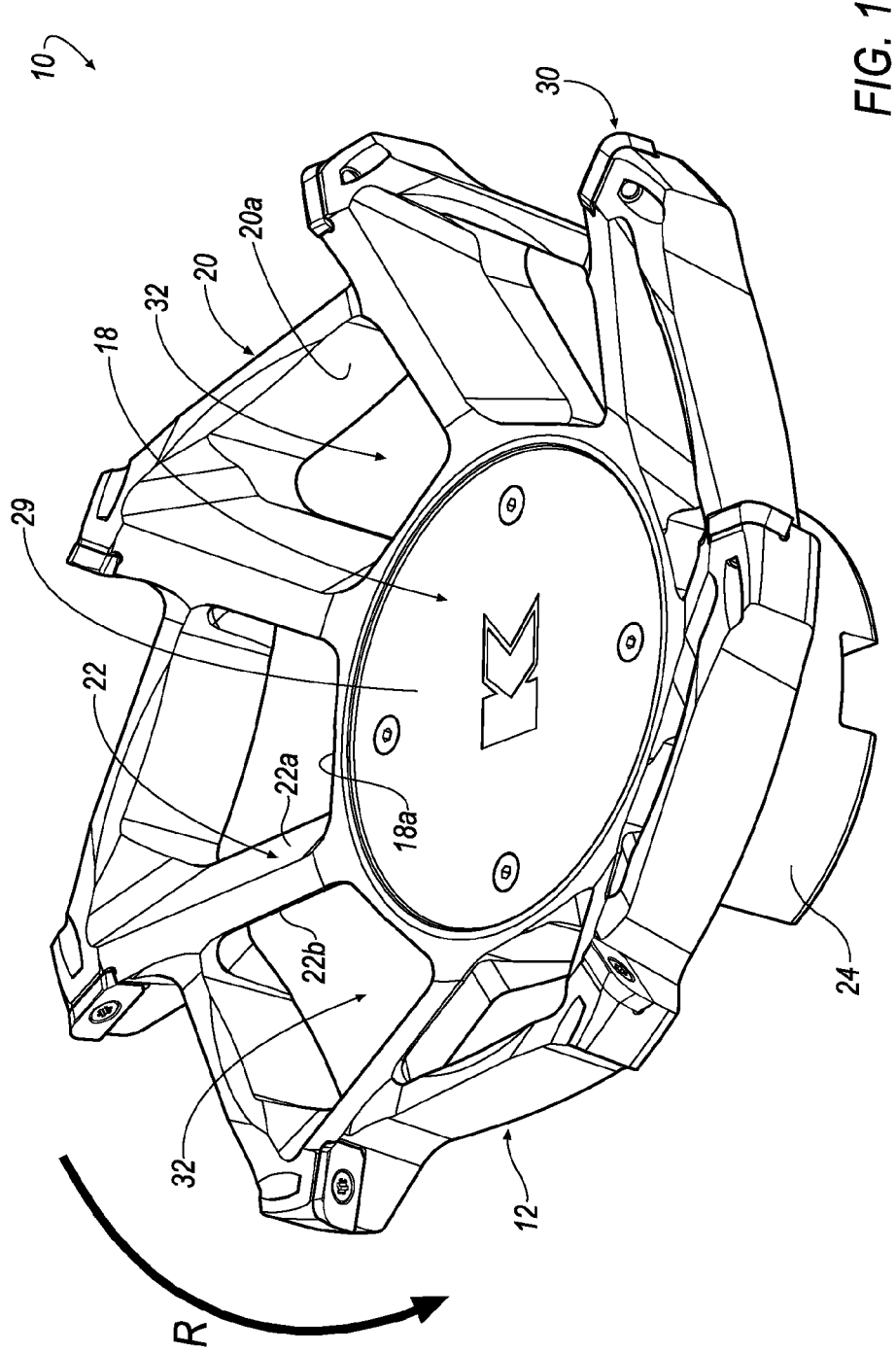
FIG. 1 shows a perspective view of a milling cutter with a central hub, a cutting rim and spokes connecting the central hub and the cutting rim for effective chip evacuation according to an embodiment of the invention.
Figure 2:
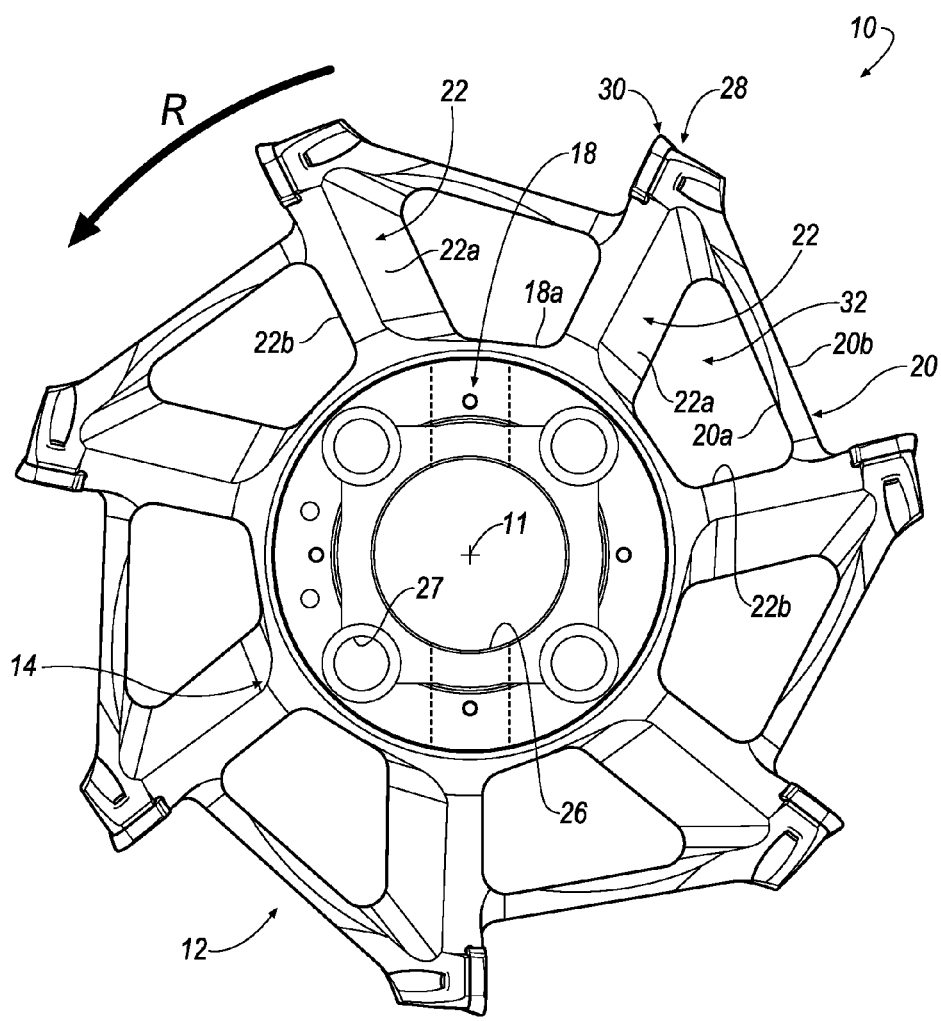
FIG. 2 shows a top view of the milling cutter of FIG. 1.
Figure 3:
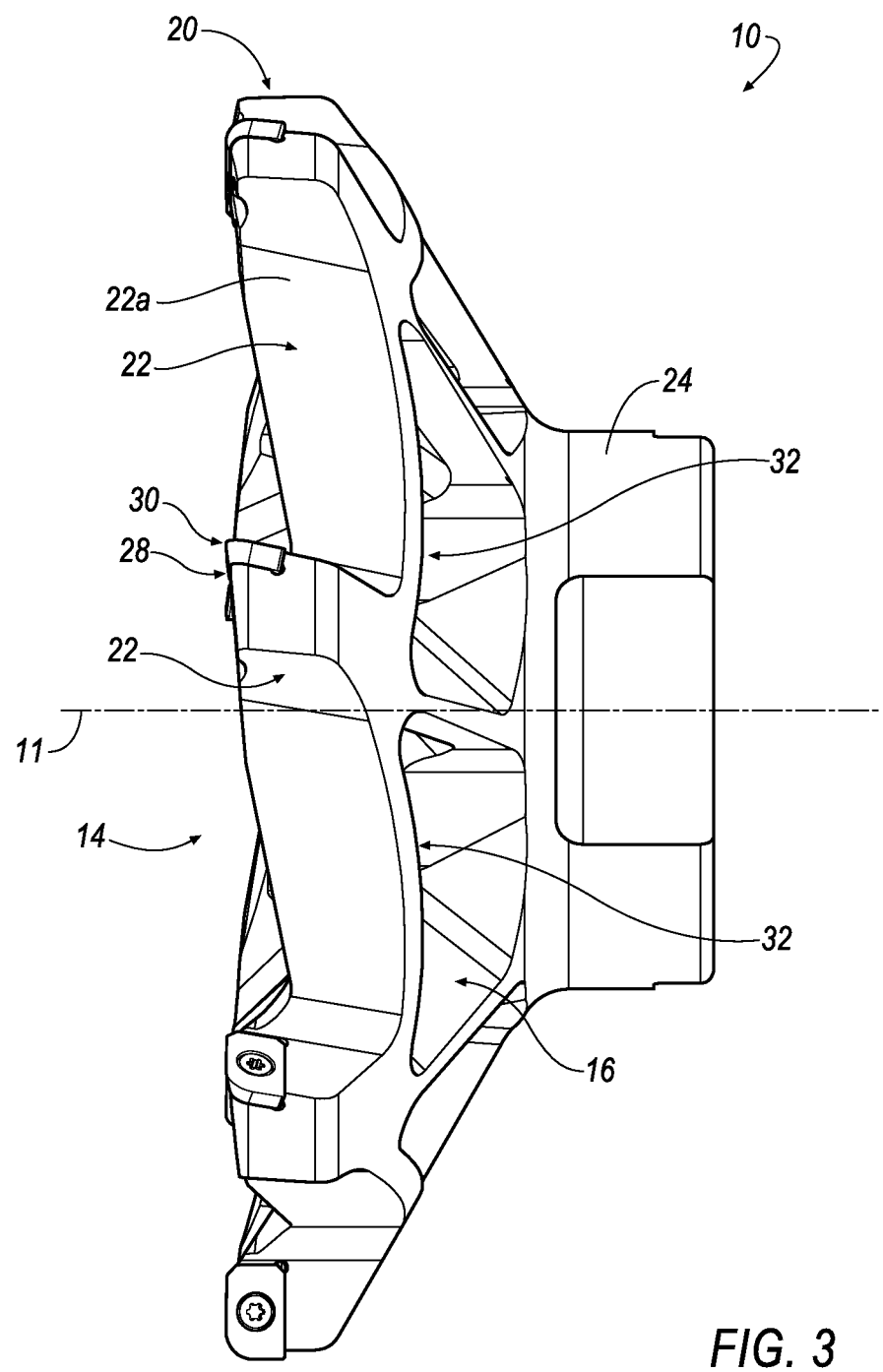
FIG. 3 shows a side view of the milling cutter of FIG. 1.

Referring now to FIGS. 1-3, a rotary cutting tool 10 for use in chip forming and material removal operations is shown according to an embodiment of the invention. In operation, the rotary cutting tool 10 rotates about a central axis 11 in a direction indicated by the arrow "R" to remove material from a workpiece (not shown). In the illustrated embodiment, the rotary cutting tool 10 is a milling cutter. However, it will be appreciated that the invention is not limited by the rotary cutting tool comprising a milling cutter, and that the invention can be practiced with any desired milling cutter, such as a face milling cutter, an end milling cutter, gang milling cutter, straddle milling cutter, shell milling cutter, slot milling cutter, form milling cutter, turn milling cutter, plain milling cutter, side milling cutter, and the like.

In general, the milling cutter 10 includes a body 12 having a front face 14 that is proximate the workpiece during a material removal operation, and a rear face 16 that is distal the workpiece during a material removal operation. The milling cutter 10 also includes a central hub 18, and a cutting rim 20 that is connected to the central hub 18 by a plurality of spokes 22 extending outward in a radial direction from the central hub 18 to the cutting rim 20. The cutting rim 20 is formed by an inner wall 20a and an outer wall 20b. In one embodiment, the body 12 is made of structural steel to provide adequate stiffness because of the unique design of the milling cutter 10.

The milling cutter 10 also includes a collar 24 extending from the central hub 18 with a bore 26 for receiving a support shaft (not shown). The central hub 18 may also include a plurality of apertures 27 for attaching the milling cutter 10 to an arbor (not shown), a collet (not shown), a toolholder (not shown) and transmitting power from a spindle (not shown) to the milling cutter 10. It shown be known that the spindle (not shown) is part of a computer controlled machining system, such as a CNC system (not shown) that may include a vacuum system for the suctioning of chips formed during the material removal operation. The front face 14 of the central hub 18 may be covered with an optional cover plate 29 for aesthetic purposes.

The cutting rim 20 is provided with a plurality of pockets 28 formed about the perimeter of the milling cutter 10 that are capable of receiving a cutting insert 30. In the illustrated embodiment, the milling cutter 10 has seven (7) pockets 28 that are unequally spaced about the perimeter of the body 12. That is, the pockets 28 are not located equally at an angle of 360/7 degrees (about 51.43 degrees) about the perimeter of the cutting rim 20, but are located at different, unequal angles. The unequally-spaced pockets 28 help minimize harmonic vibration and chatter of the cutting tool 10 to provide a smooth cut of the workpiece.

It should be appreciated that the milling cutter body 12 may contain a number of pockets different from that shown in this specific embodiment. Further, it should also be appreciated that the spacing between the pockets may be different from that disclosed herein. In this regard, the number and position of the pockets can vary depending upon the specific application for the milling cutter assembly. Thus, the design of the pockets 28 are not intended to limit the scope of the invention to the specific geometry of the body 12 and orientation of the pockets therein, such as those shown in the drawings herein.

It should also be noted that the body 12 includes seven (7) spokes 22, which corresponds in number to the number of pockets 28. More specifically, a pocket 28 is located at the end of each spoke 22 and extends radially outward on the cutting rim 20.

Figure 4:
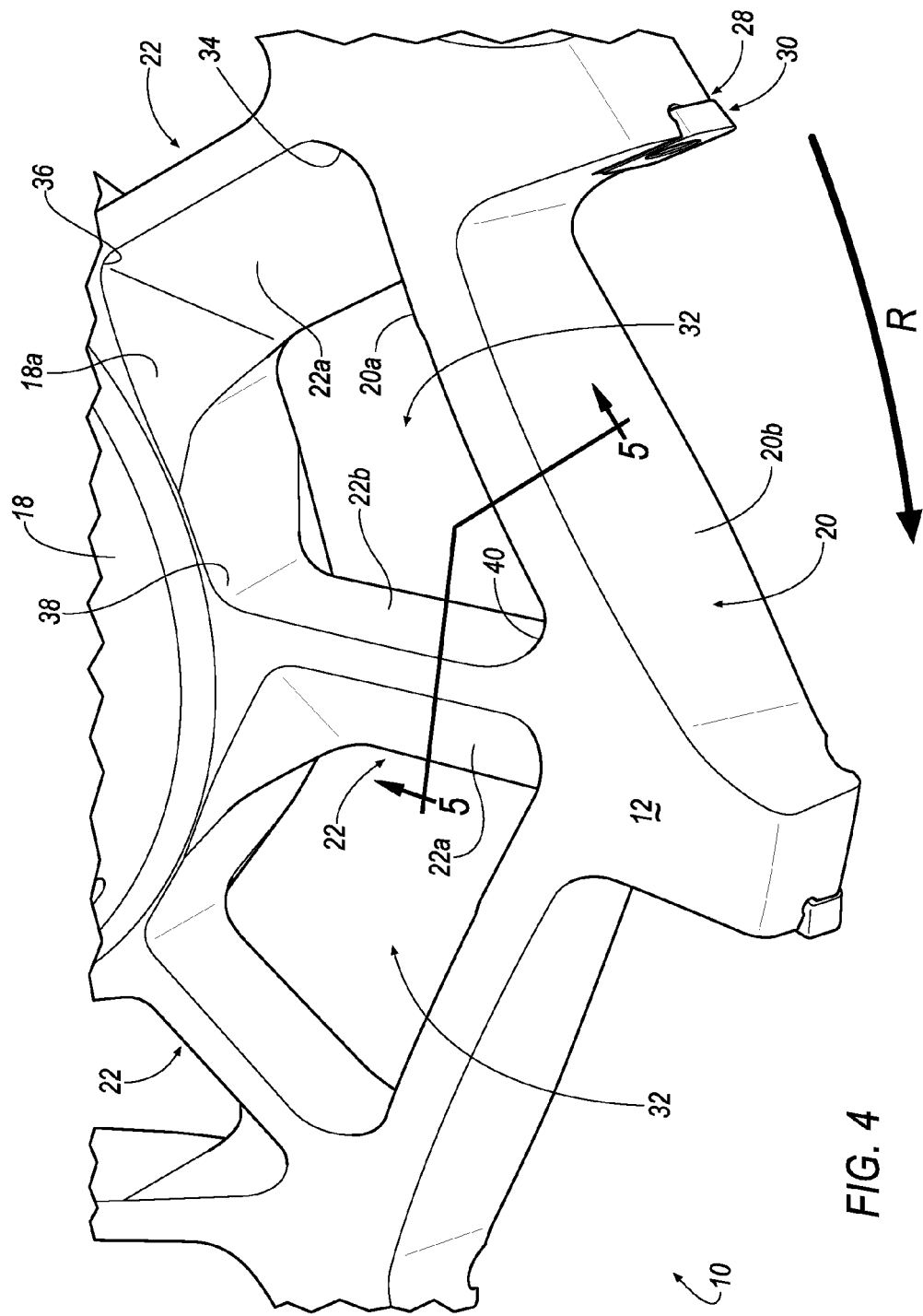
FIG. 4 shows an enlarged view of the central hub, the cutting rim and spokes.
Figure 5:
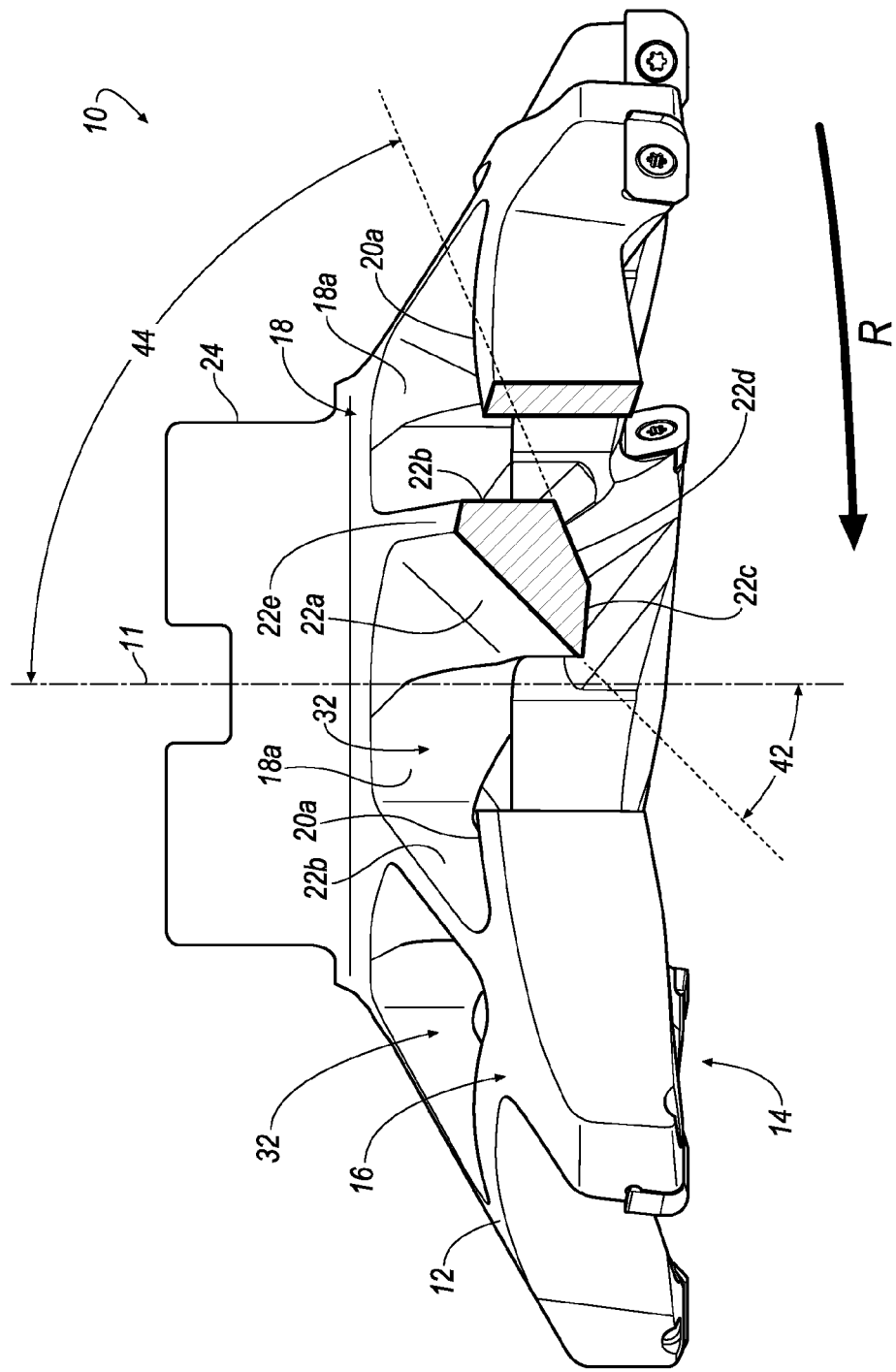
FIG. 5 shows a cross-sectional view of the spoke taken along line 5-5 of FIG. 4.

Referring now to FIGS. 4 and 5, the central hub 18, the cutting rim and the plurality of spokes 22 are separated by an opening 32 that is suitable in size and shape to permit chips to flow through the opening 32 during a material removal operation. In the illustrated embodiment, the opening 32 is polygonal in shape when the milling cutter 10 is viewed from the top. Specifically, the opening 32 is quadrilateral in shape having four side walls 20a, 22a, 18a, 22b and four vertices or radiused corners 34, 36, 38, 40. More specifically, the side wall 20a is formed by the inner wall 20a of the cutting rim 20, the other side wall is formed by the outer side wall 18a of the central hub 18, and the side walls are formed by the opposing side walls 22a, 22b of the spoke 22.

The four vertices or radiused corners 34, 36, 38, 40 have interior angles that add up to three hundred sixty (360) degrees. Specifically, the radiused corner 34 is formed at an angle less than ninety (90) degrees with respect to the side walls 20a, 22a. The radiused corner 36 is formed at an angle greater than ninety (90) degrees with respect to the side walls 22a, 18a. The radiused corner 38 is formed at an angle of approximately ninety (90) degrees with respect to the side walls 18a, 22b. The radiused corner 40 is formed at an angle of approximately ninety (90) degrees with respect to the side walls 22b, 20a.

Each spoke 22 is polygonal in cross-sectional shape. Specifically, the spoke 22 is pentagonal in cross-sectional shape having side walls 22a and 22b formed by the spoke 22. In addition, the spoke 22 has two front walls 22c, 22d and a rear wall 22e. In the illustrated embodiment, the side wall 22a is formed at a pitch angle 42 in a range between about thirty-five (35) degrees to about fifty-five (55) degrees with respect to the central axis 11 of the cutting tool 10. In one embodiment, the angle 42 is about forty-five (45) degrees with respect to the central axis 11 of the cutting tool 10.

In the illustrated embodiment, the side wall 22b is formed substantially parallel to the central axis 11 of the cutting tool 10, and the front wall 22c is formed substantially perpendicular to the central axis 11 of the cutting tool 10. In the illustrated embodiment, the front wall 22d is formed at an angle 44 in a range between about sixty (60) degrees to about seventy-five (75) degrees with respect to the central axis 11 of the cutting tool 10. In one embodiment, the angle 44 is about sixty-eight (68) degrees with respect to the central axis 11 of the cutting 10.

In operation, in order to create sufficient vacuum for effective chip evacuation, maintaining a minimum Surface Feet Per Minute (SFM) of 4000 is recommended. This number is derived from the formula (π*Cutting Diameter*RPM)/12. Chips are produced from the workpiece proximate the front face 14 of the cutting tool 10 during the material removal operation. The angle 42 of the side wall 22a is sufficient to cause lift of the chips from the front face 14 of the cutting tool 10. The chips then pass through the opening 32 and out the rear face 16 of the cutting tool 10, thereby providing effective chip evacuation during the material removal operation. In the case where the cutting tool 10 is operatively connected to a machining system with a vacuum system, even further effective chip evacuation can be achieved.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A rotary cutting tool for removing material from a workpiece, comprising:
    a body having a central hub and a cutting rim; and
    a plurality of spokes extending outward in a radial direction from the central hub to the cutting rim, each spoke separated by an opening,
    wherein each spoke is polygonal in cross-sectional shape formed by two side walls, two front walls and a rear wall, and
    wherein one of the side walls is formed at a pitch angle in a range between about thirty-five degrees to about fifty-five degrees with respect to a central axis of the cutting tool that creates a sufficient vacuum such that chips produced during a material removal operation are lifted through the opening, thereby providing effective chip evacuation during the material removal operation.

2. The rotary cutting tool according to claim 1, wherein the pitch angle maintains a minimum Surface Feet Per Minute (SFM) of 4000.

3. The rotary cutting tool according to claim 1, wherein the pitch angle is about forty-five degrees with respect to the central axis of the cutting tool.

4. The rotary cutting tool according to claim 1, wherein the other one of the side walls is formed substantially parallel to a central axis of the cutting tool.

5. The rotary cutting tool according to claim 1, wherein one of the front walls is formed perpendicular to a central axis of the cutting tool.

6. The rotary cutting tool according to claim 5, wherein the other one of the front walls is formed at an angle in a range between about sixty degrees to about seventy-five degrees with respect to the central axis of the cutting tool.

7. The rotary cutting tool according to claim 6, wherein the angle is about sixty-eight degrees with respect to the central axis of the cutting tool.

8. The rotary cutting tool according to claim 1, wherein each opening is quadrilateral in shape having four side walls and four radiused corners.

9. A rotary cutting tool for removing material from a workpiece, comprising:
    a body having a central hub, a cutting rim, and a plurality of spokes connecting the central hub to the cutting rim, each spoke separated by an opening and polygonal in cross-sectional shape formed by two side walls, two front walls and a rear wall,
    wherein one of the side walls of each spoke is formed at a pitch angle in a range between about thirty-five degrees to about fifty-five degrees with respect to a central axis of the cutting tool that is sufficient to create a vacuum such that chips are lifted through the opening, thereby providing effective chip evacuation during a material removal operation.

10. The rotary cutting tool according to claim 9, wherein the pitch angle is about forty-five degrees with respect to the central axis of the cutting tool.

11. The rotary cutting tool according to claim 9, wherein the other one of the side walls is formed parallel to the central axis of the cutting tool.

12. The rotary cutting tool according to claim 9, wherein one of the front walls is formed substantially perpendicular to the central axis of the cutting tool.

13. The rotary cutting tool according to claim 12, wherein the other one of the front walls is formed at an angle in a range between about sixty degrees to about seventy-five degrees with respect to the central axis of the cutting tool.

14. The rotary cutting tool according to claim 13, wherein the angle is about sixty-eight (68) degrees with respect to the central axis of the cutting tool.

15. The rotary cutting tool according to claim 9, wherein each opening is quadrilateral in shape having four side walls and four radiused corners.

16. The rotary cutting tool according to claim 9, wherein the pitch angle maintains a minimum Surface Feet Per Minute (SFM) of 4000.

* * * * *